Feb. 10, 1942.  O. P. HAEGELE  2,272,703
PLASTERBOARD MANUFACTURING MACHINE
Filed Feb. 17, 1940  7 Sheets-Sheet 1
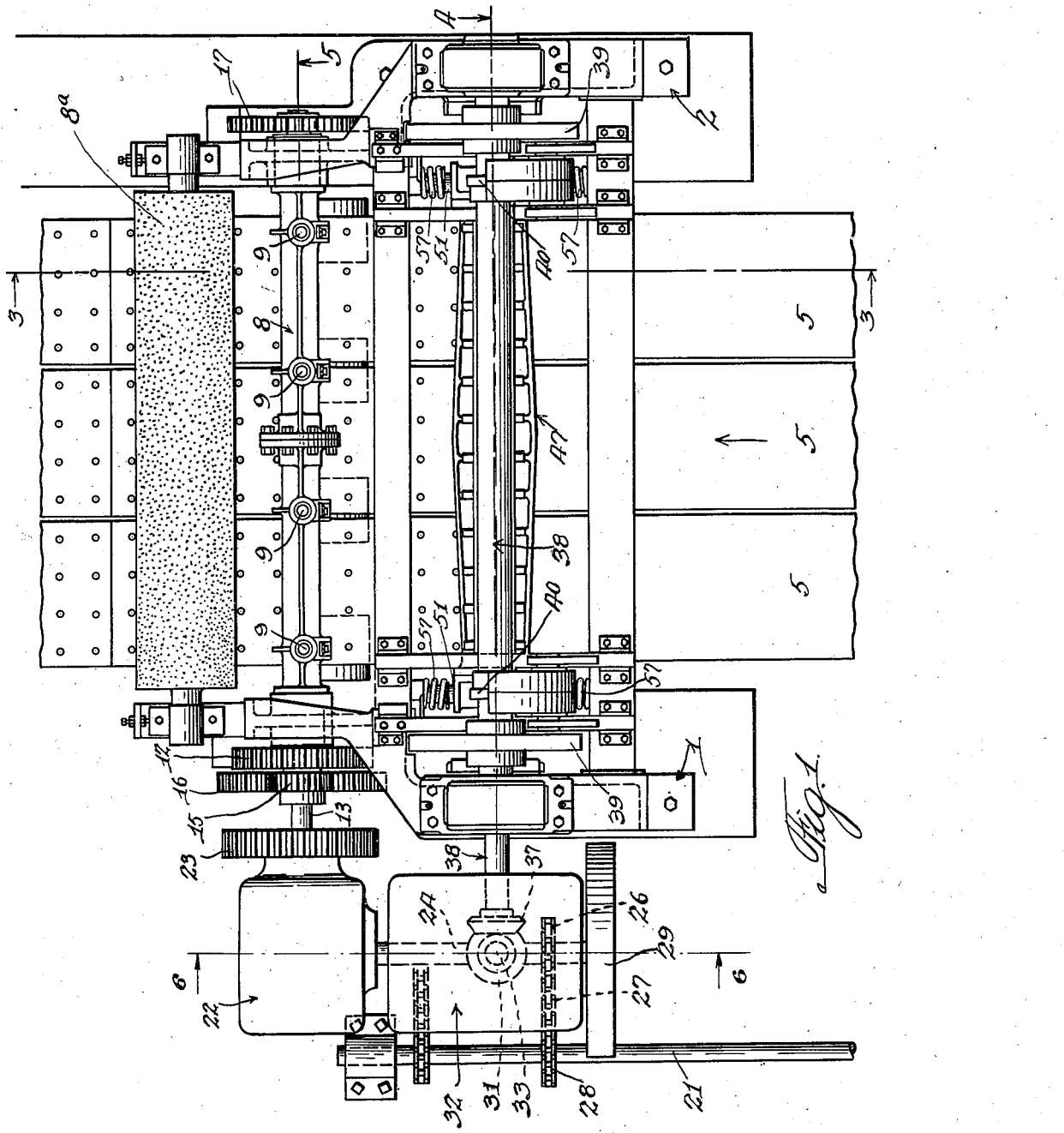
INVENTOR
Otto P. Haegele:
By: Thiess, Olson & Mecklenburger.
ATTORNEYS.

Feb. 10, 1942.     O. P. HAEGELE     2,272,703
PLASTERBOARD MANUFACTURING MACHINE
Filed Feb. 17, 1940     7 Sheets-Sheet 2
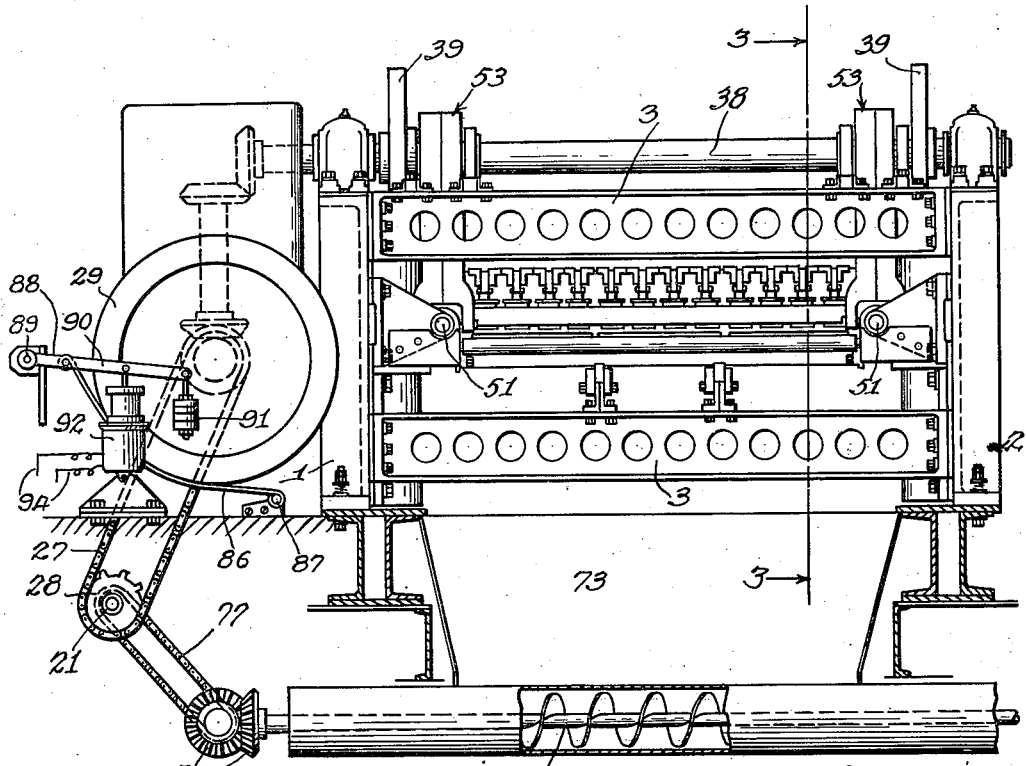
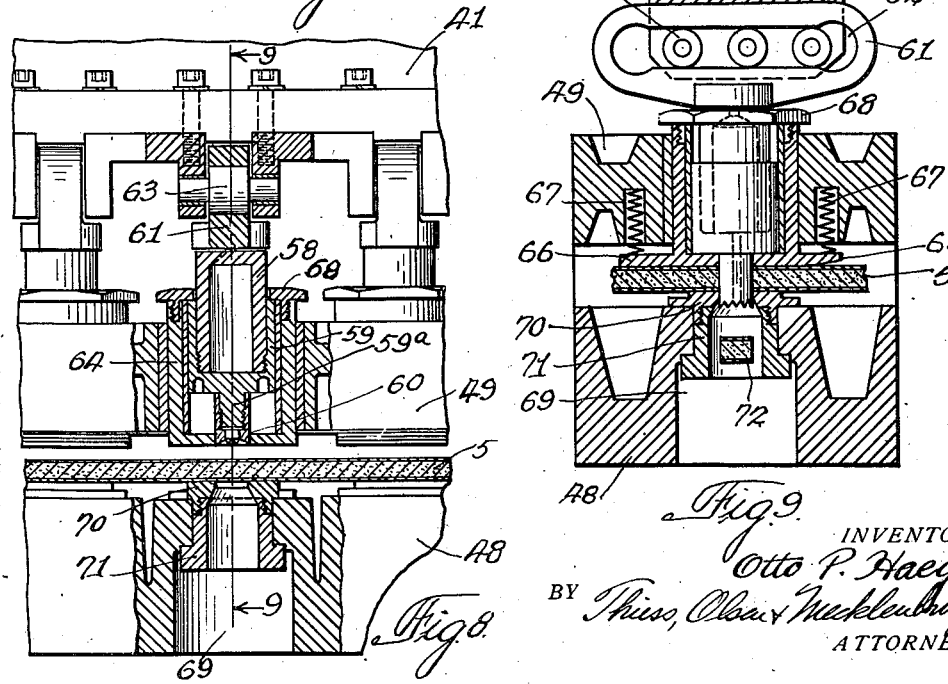
INVENTOR
Otto P. Haegele
BY Thiess, Olsen & Mecklenburger
ATTORNEYS

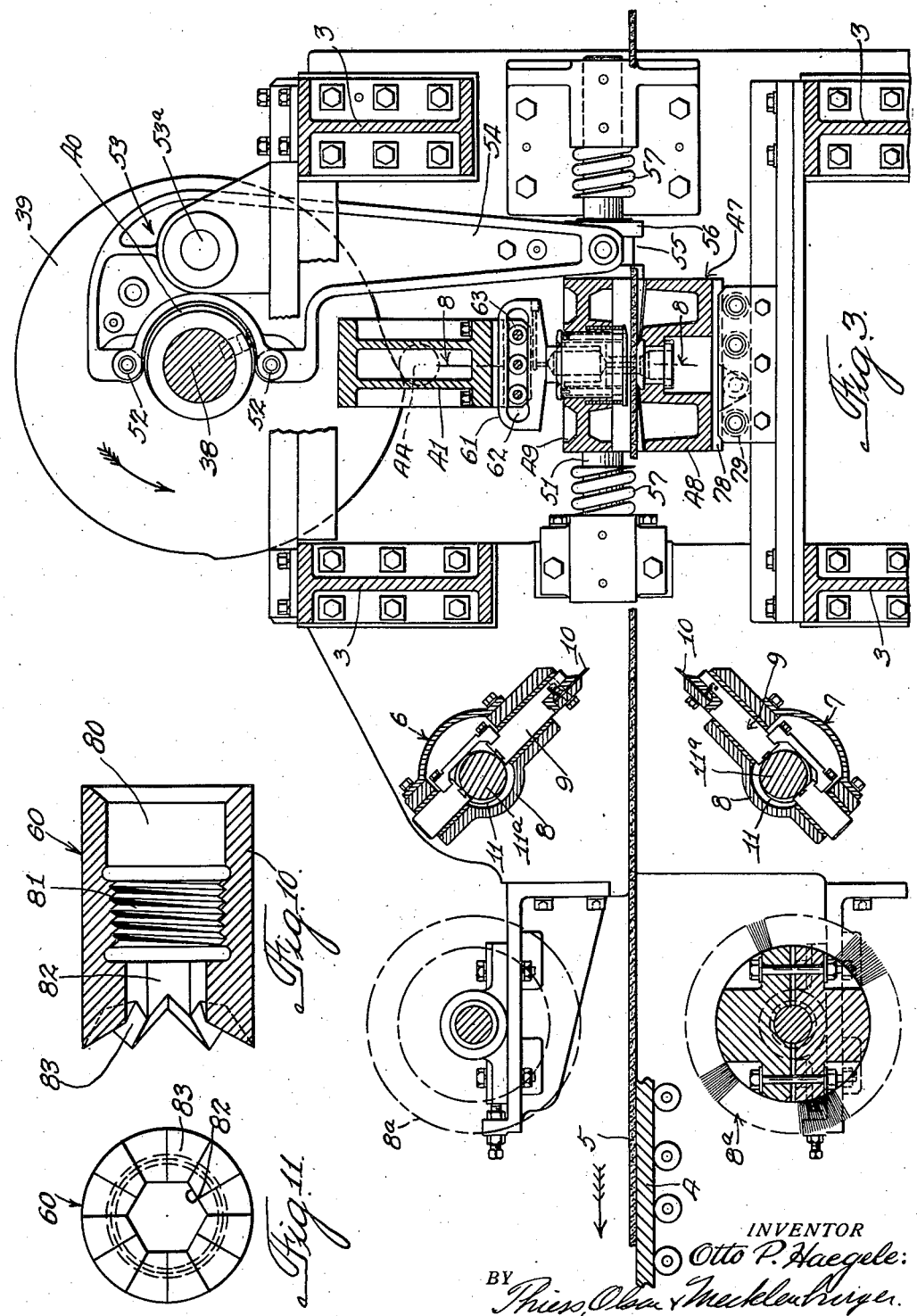

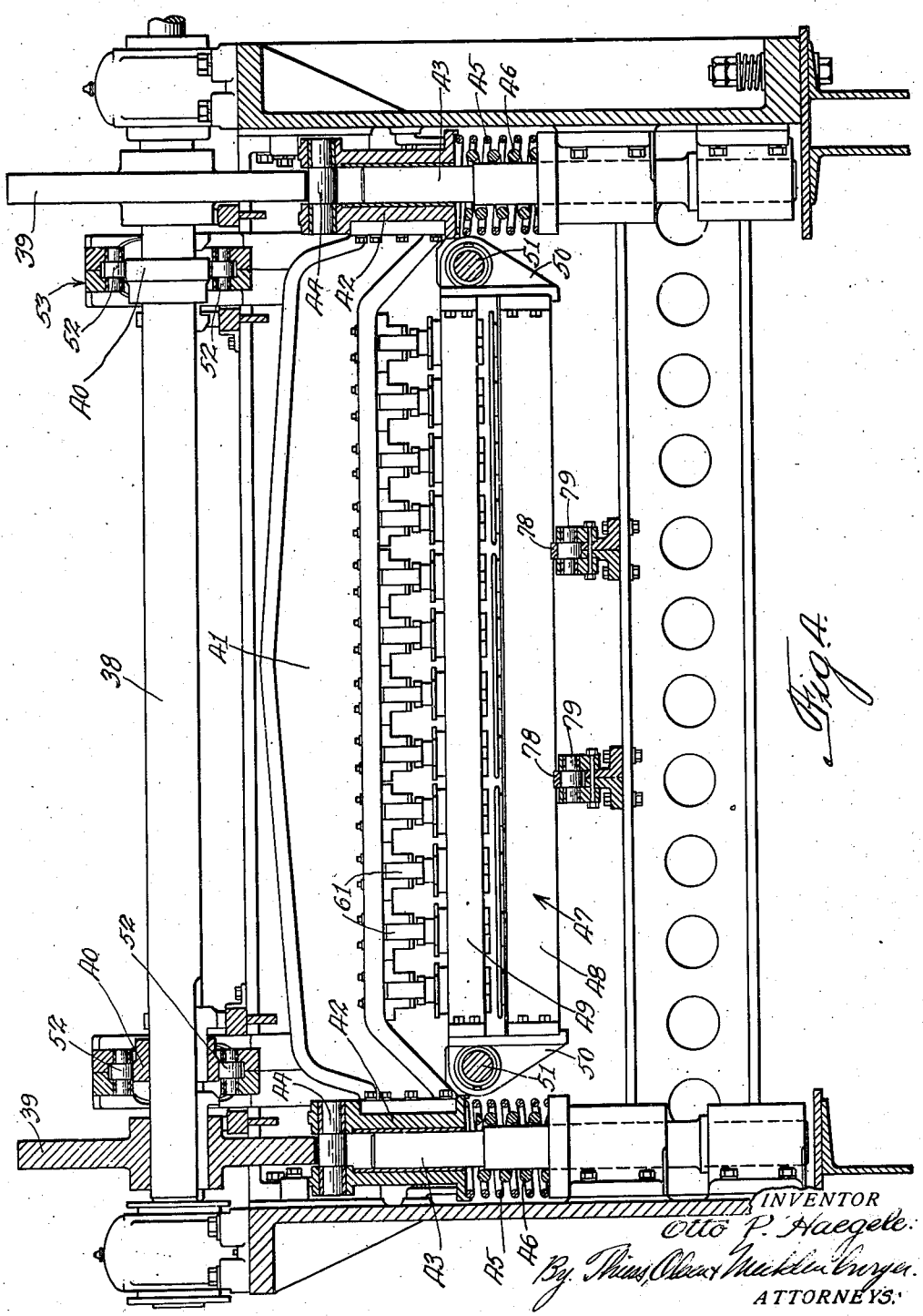

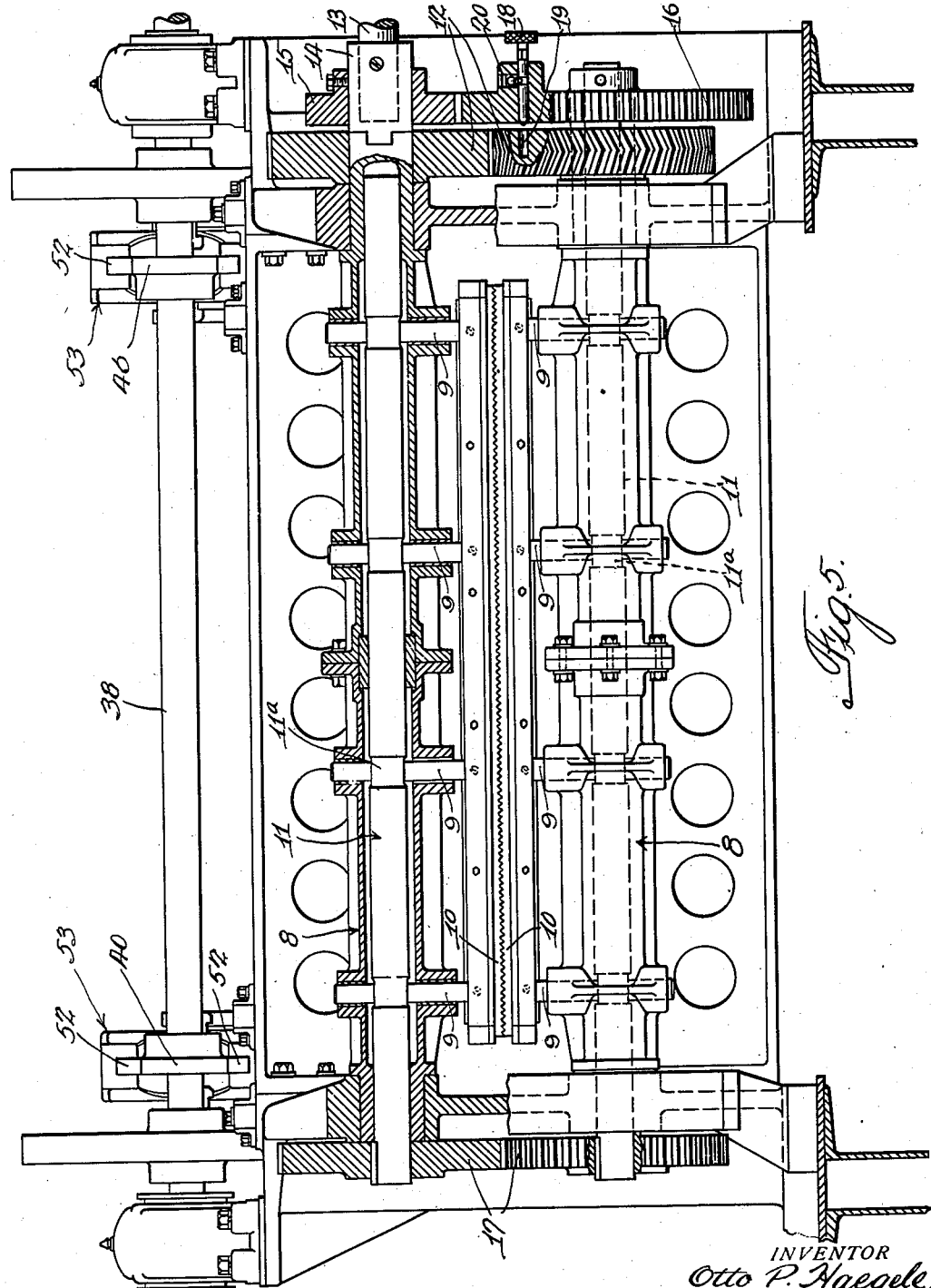

Feb. 10, 1942.  O. P. HAEGELE  2,272,703
PLASTERBOARD MANUFACTURING MACHINE
Filed Feb. 17, 1940  7 Sheets-Sheet 6

Inventor:
Otto P. Haegele

Feb. 10, 1942.   O. P. HAEGELE   2,272,703
PLASTERBOARD MANUFACTURING MACHINE
Filed Feb. 17, 1940   7 Sheets-Sheet 7
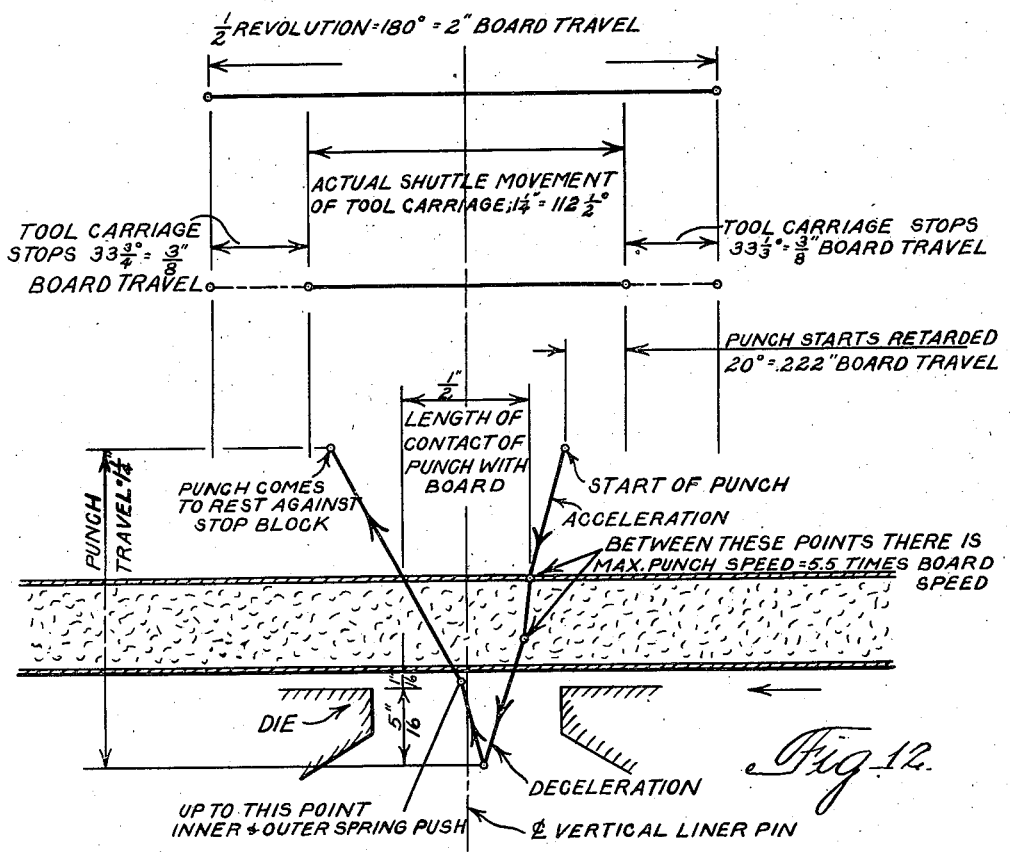
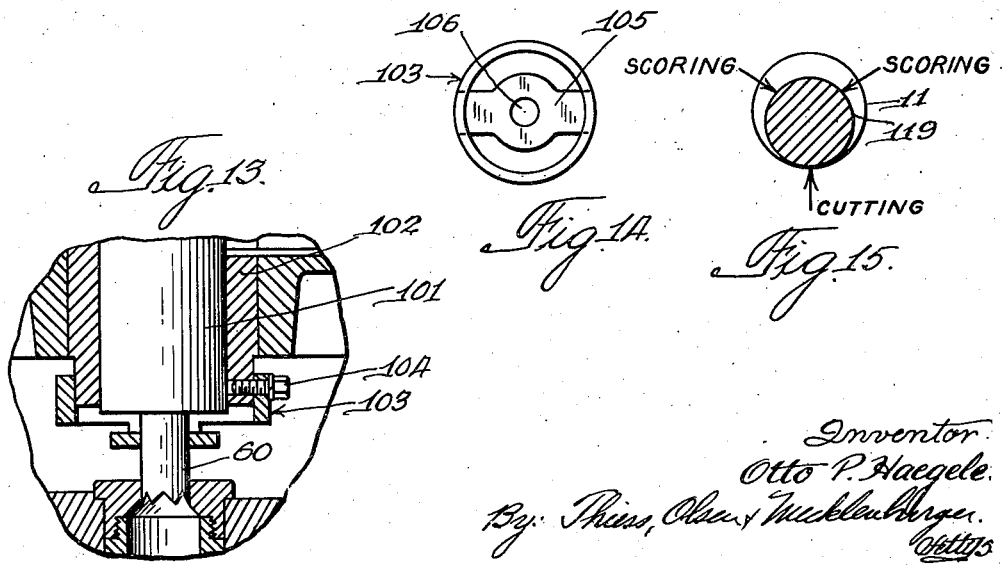

Patented Feb. 10, 1942

2,272,703

UNITED STATES PATENT OFFICE 2,272,703

PLASTERBOARD MANUFACTURING MACHINE

Otto P. Haegele, Chicago, Ill., assignor to United States Gypsum Company, Chicago, Ill., a corporation of Illinois Application February 17, 1940, Serial No. 319,406

25 Claims. (Cl. 164—16)

This invention relates to a combined web manufacturing and perforating machine and more particularly to a machine for perforating moving webs or strips of plaster board and cutting off or severing the web to provide perforated boards of predetermined lengths. Also, the web may be severed into lengths which are multiples of predetermined board lengths and scored intermediate the severed ends whereby they may later be broken at the scored lines to provide standard length plaster boards.

It is an object of the invention to provide a machine of the character described which will perforate a moving web, such as the usual plaster board web, as it is discharged from the web forming apparatus, the web preferably being perforated and cut into lengths while it is still in a moist condition; that is, before it is delivered to the usual dryer. The perforations may be of any suitable size but are preferably comparatively large and symmetrically spaced throughout the extent of the boards to be cut from the web, and the severing and scoring operations may be performed at predetermined intermediate points between transverse rows of perforations.

A further object is to provide an improved mechanism wherein the perforating and cutting operations are performed during the continuous movement of the web, and in which the movement of the perforators through the web and simultaneously in the direction of movement of the web is so related as to provide a more efficient method of perforating, and also wherein the punching operations may rapidly be performed in a manner to provide smooth-walled perforations and without tearing or otherwise mutilating the usual paper covering of the plaster board web.

The particular embodiment illustrated and described herein is especially adapted for the manufacture of so-called plaster board lath, either perforated or unperforated, and such lath are usually sixteen inches wide and forty-eight inches long, for use with standard studding, and are approximately three-eighths of an inch thick. It will be apparent that the machine is adapted to perforate webs of various widths and thicknesses.

It is therefore an object to provide a combined perforating, cutting, and severing machine for a continuously moving web, in which the machine is adapted to accommodate webs such as plaster board, and the like, of various dimensions, without material adjustment of the machine and in which all of the various operations are automatically performed in a manner to provide a machine peculiarly adapted for high speed quantity production.

Plaster board web is commonly made by continuously delivering a layer of suitable plastic material onto a moving cover strip, such as paper; applying another cover strip to the top of the material; folding and securing the edges of the cover sheets around the edges of the web, and passing the web between presser rollers. Several continuous webs are often delivered to a single conveyor which directs these webs through a cutting machine for simultaneously cutting all of the webs into predetermined plaster board lengths. The cut plaster boards are then delivered from the cutting machine to another conveyor by which they are directed into a drying oven or otherwise disposed of as desired. The perforating, severing and scoring portions of the present invention are therefore intended to receive, from a suitable conveyor, one or more webs as required and to perforate these webs and deliver the severed and perforated plaster boards to the discharge conveyor.

Another object is the provision of suitable control means whereby the cutting and perforating mechanisms may accurately be synchronized with the moving web and the web forming mechanisms so that all perforations are accurately positioned relative to the predetermined dimensions of the finished boards.

Previous perforating machines for plaster board have been comparatively slow in operation and not adapted for high speed quantity production. The punches have been operated from a crankshaft, and, as the perforating operation takes place at the bottom of the stroke or, in other words, while the crank is passing dead center, there is a considerable dwell of the punch at the bottom of the stroke. In such machines, the entire perforating operation takes place at the slowest part of the cycle and therefore the web must travel at a comparatively slow speed. Otherwise, an extremely long travel of the punch with the web, and return, is required.

By the use of the present invention, the speed of the web and the consequent production of the finished boards have been increased approximately seventy-five per cent or more, and clean-cut perforations are provided without tearing or otherwise mutilating the cover fabric. Also, a substantially flat-end punch or its equivalent may be used, as it is unnecessary to provide thin, knife-like cutting edges. Furthermore, as the plug resulting from the perforation cannot enter the end of the punch, compressed air or other ejecting means is not required to force the plug therefrom. It merely falls by gravity or, if the web is at all sticky and there is any tendency for the plug to stick to the end of the punch, it is thrown therefrom with considerable force because of the high speed and rapid reversal of the punch. All these important considerations have very materially increased production.

A further object is the provision of a plaster board perforating machine in which the speed of the punch is varied during predetermined portions of the stroke, whereby the perforating of the upper and lower fabrics by the punch and die, respectively, may be accomplished at different speeds, particularly adapted to produce unmutilated perforations.

It is also an object to provide a novel type of punch structure and stripper in which the punch tip may quickly and easily be removed and replaced.

Further objects and advantages of the invention will be apparent from the description and appended claims.

In the drawings:

Fig. 1 is a top plan view of one embodiment of the combined cutting and perforating mechanism of this invention, adapted for simultaneously perforating and cutting one or more webs of plaster board or other suitable material. Certain portions of the transmission are diagrammatically illustrated.

Fig. 2 is an end view of the embodiment shown in Fig. 1 and is taken from the delivery end of the machine, a portion being broken away to illustrate the conveyor mechanism for carrying away the plugs removed by the perforating operation.

Fig. 3 is a vertical sectional view through the embodiment shown in Figs. 1 and 2 and is taken on a line substantially corresponding to line 3—3 of Figs. 1 and 2.

Fig. 4 is a transverse sectional view through the perforator carriage operating mechanism and taken on a line substantially corresponding to line 4—4 of Fig. 1, the perforating elements and the support or carriage therefor being shown in full lines.

Fig. 5 is a transverse vertical sectional view through the cutting mechanism and is taken on a line substantially corresponding to line 5—5 of Fig. 1.

Figure 6:
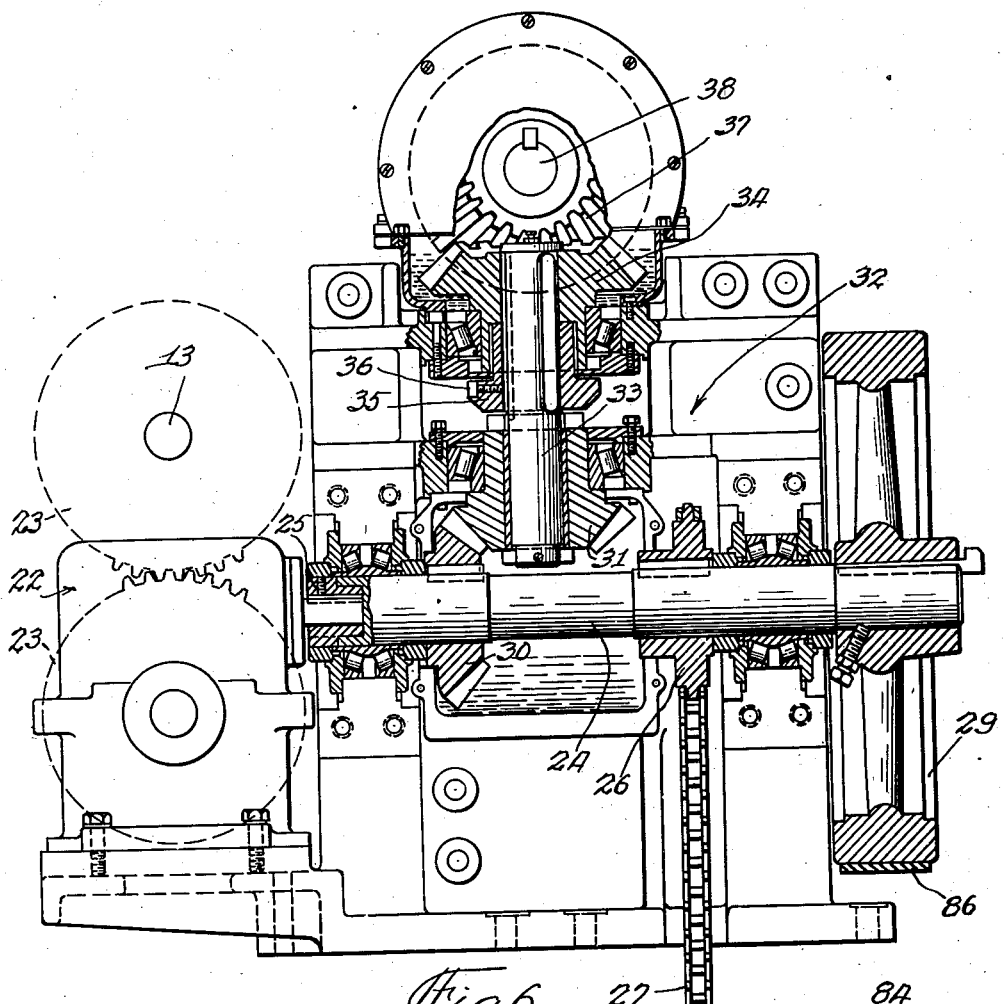

Fig. 6 is a vertical sectional view through the transmission shown diagrammatically in Figs. 1 and 2 and is taken on a line substantially corresponding to line 6—6 of Fig. 1.

Figure 7:
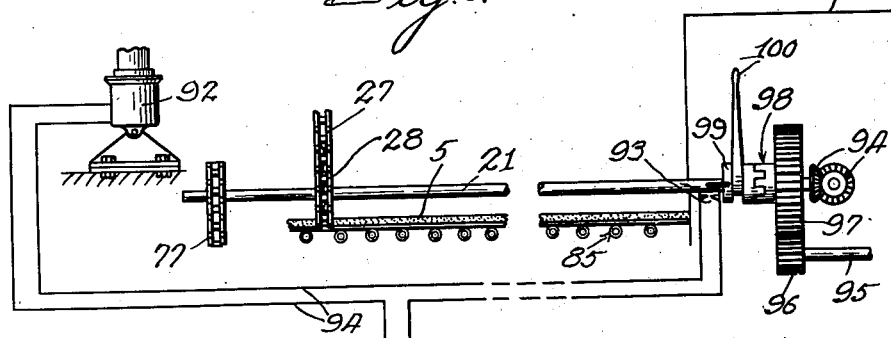

Fig. 7 is a diagrammatic view of the driving mechanism and braking control.

Fig. 8 is a vertical sectional view through one of the perforators and taken on a line substantially corresponding to line 8—8 of Fig. 3, with the perforator in its raised position.

Fig. 9 is a vertical section taken on the line 9—9 of Fig. 8 but with the perforator in its lowered position assumed during the perforating operation.

Fig. 10 is an axial sectional view through one of the perforating punches.

Fig. 11 is an end view of the perforating punch illustrated in Fig. 10.

Fig. 12 is a diagrammatic view illustrating the synchronized relationship of the movements of the cutter and web during the perforating operation.

Fig. 13 is a vertical sectional view through a modified form of stripper associated with a perforating punch.

Fig. 14 is a top view of the stripper element shown in Fig. 13.

Fig. 15 is a diagrammatic view of one of the cutter cams and illustrates the method of multiple scoring between severing operations.

Referring to the drawings in detail, the embodiment illustrated comprises side frames 1 and 2 having suitable cross bars such as I-beams 3 to provide a rigid framework for supporting the entire mechanism. A conveyor of any suitable type, preferably a belt supported on rollers as shown in Fig. 7, is provided to continuously deliver a web or webs 5 from a remotely positioned web forming mechanism to the perforating and cutting mechanisms, from which the cut lengths are removed by means of a discharge conveyor 4 (Fig. 3). The web first passes through the perforating mechanism and then between two rotatable cutter units 6 and 7 positioned above and below the web, respectively, and operable to transversely cut the web into predetermined lengths as it passes therebetween.

The cutting and scoring mechanism is similar to that shown and fully described in my copending application Serial No. 313,545, filed January 12, 1940, and, in fact, is substantially identical therewith, except that the control for intermittent rotation of the cutter units is omitted in the present instance, and the radius of the cutting edge is increased in each unit 6 and 7 so that the units may continuously be rotated to sever the web with each revolution, to thereby provide standard length boards, or to alternately sever and score with the same cutting edges to provide double length board units which later may be broken apart at the intermediate scored line to provide two boards of standard length.

Each cutter unit may comprise a hollow shaft 8 having cam followers 9 transversely mounted therein and adapted to support elongated cutter knives 10, the cutting edges preferably being serrated as shown in Fig. 5. The cam followers 9 are in operative engagement with suitable cams on cam shafts 11, which latter are mounted for rotation within the hollow shafts 8. The cam shafts 11 are provided with cam portions 11a cooperating with the followers 9.

The hollow cutter shafts 8 are operatively connected together by means of gears 12 (Fig. 5) for rotation in opposite directions and at the same speed and are driven from a shaft 13 through a coupling 14 adapted to engage the end of the upper hollow shaft 8 as shown. A pinion 15 is removably secured on the coupling 14 and is in driving relation with a gear 16 secured on the lower cam shaft 11, the upper and lower cam shafts 11 being connected at their opposite ends for simultaneous rotation in opposite directions and at the same speed by means of gears 17, one of which is secured to each of the cam shafts as shown in Fig. 5. The gear ratios are such that the cam shafts are preferably rotated one-half of a revolution for each complete revolution of the cutter shafts 8. Therefore, the cutters 10 will alternately be extended and retracted during successive rotations thereof to alternately sever and score the web in substantially the same manner as illustrated and described in the previously mentioned copending application. A suitable rotary brush 8a is positioned adjacent each cutter unit and in a position to engage and clean each knife as it passes thereby.

It is sometimes desirable to omit the scoring and sever the web with each revolution of the cutter shafts. In order to accomplish this result, the pinion 15 may be moved out of mesh with the gear 16, which latter is provided with a sliding pin 18 adapted to be inserted in a complementary hole 19 in the lower cutter shaft gear 12, thereby locking the transmissions together so that all of the shafts rotate together at the same speed. By this means the knives or cutters are held extended at all times to completely sever the web with each revolution by cutting from each side toward the center of the web. The pin 18 may be held in either of its extreme positions by means of a spring latch 20.

The shaft 13 for driving the cutter shafts 6 and 7 and the cam shafts 11 is driven from a main drive shaft 21 (Figs. 1, 2, and 7) through a transmission shown in detail in Fig. 6 and comprising a speed reducing mechanism 22 operatively connected to the shaft 13 by means of gears 23. The speed reducing mechanism is driven by a short shaft 24 connected thereto by means of a coupling 25. The short shaft 24 is provided with a sprocket 26 secured thereto and connected by means of a chain 27 to a sprocket 28 secured on the main drive shaft 21. The shaft 24 is provided with a flywheel 29 having a suitable brake mechanism and control applied thereto, which will later be described.

The perforating mechanism is driven from the shaft 24 (Fig. 6) by means of a bevel gear transmission comprising a gear 30 secured to shaft 24 and meshing with a gear 31 rotatably mounted in suitable bearings on a transmission casing 32 and adapted to freely rotate on a short vertical shaft 33.

A bevel gear 34 is also supported in suitable bearings in the casing 32 and is splined to the vertical shaft 33, the splines being extended sufficiently to cooperate with a driven clutch member 35 which is slidably mounted on the shaft 33 and provided with clutch teeth adapted for engagement by complementary clutch teeth on the gear 31. The gear 31 forms the driving member of the clutch and the driven member 35 may be lowered into clutch engaging position when it is desired to drive the perforator simultaneously with the cutting or severing mechanism. When it is desired to stop the perforator and operate only the cutting mechanism, the driven clutch member 35 may be raised to the disengaged position shown in Fig. 6 and retained in raised position by means of a set screw 36 or other suitable means.

The driven bevel gear 34 drives a companion bevel gear 37, which latter is secured to a transverse cam shaft 38 mounted in suitable bearings at the top of the frame. The shaft 38 is provided with a pair of cams 39 (Figs. 2, 3, and 4) for vertically reciprocating the perforators and timing the vertical movement thereof. A pair of cams 40 is also secured to the shaft 38 for horizontal reciprocation of the perforator carriage whereby the entire transverse row of perforator punches and dies may travel with the web and at the same speed during the perforating operation.

The actual perforating mechanism comprises a transverse bar or frame member 41 (Figs. 3 and 4) on which are supported the perforators or punches. The bar 41 is provided with vertical end bearings 42 (Fig. 4) which are mounted for vertical reciprocation on stub shafts 43 supported in the frame members 1 and 2. The bearings 42 are provided at their upper ends with cam follower rollers 44 mounted thereon and operatively engaged by the previously mentioned cams 39 so that the bar 41 and punches suspended thereon are vertically reciprocated, during each rotation of the cams 39, against the compression of springs 45, associated with each stub shaft 43 and on which the bearings 42 of the bar 41 are supported. The springs 45 cause the rollers 44 of the unit accurately to follow the cams 39. Somewhat heavier springs 46 are mounted within the springs 45, and these heavier springs are of such length and strength that they are compressed by the perforating unit only during the latter portion of the downward stroke thereof. These heavier springs are to enable a quick intermediate deceleration of the downward movement and a rapid acceleration of the reverse movement of the perforator unit whereby the perforating operation may accurately be performed in an exact predetermined relationship to the moving web, as illustrated diagrammatically in Fig. 12, and which will be described later.

The perforator mechanism also includes a punch and die carriage comprising a frame 47 mounted for horizontal reciprocating movement simultaneously with the vertical reciprocating movement of the perforating frame 41. This punch and die carriage 47 comprises a lower cross bar 48, positioned below the web and adapted to support a row of dies, and a very similar upper cross bar 49 positioned above the web for guiding the punches in their vertical movement through the web and into the dies. The bars 48 and 49 are secured together at each end by means of a guide block or bearing block 50 secured thereto as shown in Fig. 4 and supported for horizontal reciprocation on horizontal fixed shafts 51, one of which is mounted at each side of the machine so that the punch and die carriage 47 may horizontally be reciprocated thereon.

The horizontal reciprocation of the carriage 47 is accomplished by means of the cams 40 on the cam shaft 38 previously referred to (Figs. 3 and 4). Each of the cams 40 cooperates with diametrically opposed follower rollers 52 mounted on a bell crank cam lever 53 pivoted at 53a on the frame. Each lever 53 is provided with a downwardly-extending arm 54 which is forked at its lower end and provided with suitable rollers engaging in a slot 55 in a collar 56 on the carriage 47. One of these collars may be provided on each of the bearing blocks 50 to cooperate with its respective cam arm, whereby with each rotation of the cam shaft 38 the punch and die carriage 47 will be moved in the direction of movement of the web and at the same speed during the perforating operation and will be returned to its original position after the punch is raised sufficiently to clear the web. Springs 57 are mounted on each end of each of the horizontal fixed shafts 51 to cushion the stroke of the carriage and afford a quick reverse.

A transverse row of punches is supported for lateral movement on the vertically reciprocating bar or frame 41 and each punch comprises a hollow body formed of an upper hollow member 58 and an inverted cup-like punch-holding member 59 threaded thereon (Figs. 8 and 9). A hollow perforating tip or punch per se 60 is threaded onto the downwardly projecting reduced end 59a of the cup-like body member 59.

The punch body member 58 is provided at its upper end with a yoke 61 having a slot 62 therein whereby the entire punch unit is suspended upon rollers 63, which latter are mounted on the vertically reciprocating bar 41. This yoke and its roller support enable horizontal reciprocating movement of the carriage 47 and punches and dies therein simultaneously with a vertical reciprocating movement of the bar 41 and punches suspended therefrom.

The punch body member 59 is slidably mounted in a reciprocable combined bearing and stripper 64 mounted in the upper carriage bar 49. The bearing 64 is provided with forwardly and rearwardly extending flanges 65 and 66, respectively, which, together with the bottom wall of the member 64, form a stripper shoe for engaging the upper surface of the web. Springs 67 tend to urge the combined bearing and stripper downwardly to the stripping position (Fig. 9). As the punch is withdrawn from the web, the upper end of the punch member 59 engages the inwardly extending flange of an annular ring 68, which latter is threaded into the upper end of the bearing 64, and the combined bearing and stripper is thereby raised against the compression of the springs 67. An automatically movable stripper is thereby provided which snugly engages the web (Fig. 9) during the downward stroke of the punch and returns to its raised position (Fig. 8) as soon as the punch clears the web during the upward stroke.

The lower carriage bar 48 is provided with a row of holes 69 therethrough, each arranged to support a die 70 in alignment with its respective punch. Each die 70 may be clamped in its opening 69 by means of a hollow nut 71 through which the web plugs 72 may be discharged during the perforating operation. The plugs 72 drop by gravity into a hopper 73 (Fig. 2) from which they are directed to a screw conveyor 74, whereby they may be discharged from the machine and disposed of as desired. The plug conveyor 74 may be driven from the shaft 21 by means of any suitable transmission such as the bevel gears 76 and sprockets having a chain 77 thereon.

As previously stated, the punch and die carriage 47 is supported for horizontal reciprocation on the horizontal fixed shafts 51. In order to further support the carriage, tracks 78 are secured thereto (Figs. 3 and 4) and supported on a series of rollers 79 mounted on the frame. This provides a rigid support and prevents sagging or springing of the die bar.

Figs. 10 and 11 illustrate in detail the perforating punch tip 60 which is removably secured to the reduced end 59a of the punch body member 59 as shown in Fig. 8. The tip is provided at one end with a cylindrical aligning portion 80 which is accurately bored to provide a snug fit on a complementary aligning part of the reduced body portion 59a and is internally threaded at 81. The working end of the tip is provided with a hexagonal or other noncylindrical opening 82 adapted to receive a bent rod wrench of a cross sectional shape corresponding to the shape of the opening whereby any punch tip may readily be attached to, or removed from, its supporting body portion without disassembling the machine. The reduced ends 59a of the body portions are, of course, externally threaded to receive the tips as previously described. The hexagonal opening 82 is comparatively small so that it does not interfere in any way with the normal action of the tip as a blunt end punch.

The operating end of the punch is provided with radial V-shaped grooves 83 to provide sharp angular peripheral edges to cut the upper fabric of the plaster board without mutilation before complete compression of the plug by the blunt end of the tip to cause the lower fabric to be cut by the die.

The V-shaped grooves 83 are preferably cut with a ninety-degree cutter with a ten-degree pitch toward the center of the punch in order to provide substantially the equivalent of a blunt end punch in so far as forcing the plug from the web material and through the die is concerned. The hexagonal opening 82 also provides clearance for the cutter. In operation, the peripheral serrations first smoothly cut the top fabric of the web and, as soon as the teeth are imbedded with sufficient pressure to compress the plug portion of the material, the lower fabric is cut by the die and the plug forced through until it drops from the end of the punch.

Fig. 12 is a diagrammatic view illustrating the relative movement of a punch and the associated web. The angular heavy lines illustrate the vertical and horizontal movements of the end of the punch during a single cycle, and the angularity of portions of the line indicates the speed and acceleration and deceleration of the punch in various portions of the cycle and particularly the relationship of certain accelerated and decelerated movements with respect to the continuously moving horizontal web. The proper distribution of acceleration and deceleration during the vertical reciprocation of the punch is important in order to provide smooth-walled perforations and prevent tearing or otherwise mutilating the paper coverings of the web, and to enable high speed quantity production.

It should be noted that, with the web traveling to the left in the direction of the arrow, the maximum punch speed takes place between the upper surface of the web and a point about two-thirds of the way through the web. This provides a smooth cut through the upper fabric cover and a rapid punch through a material portion of the web. The punch then decelerates to the end of the stroke to provide a smooth cut by the die of the lower fabric cover, and during this deceleration the heavy springs 46 previously mentioned (Fig. 4) are compressed to absorb the momentum of the punches and frame or bar 41 and cause a quick reverse. After the punch is raised sufficiently to be beyond the influence of the heavy springs 46, the upward movement decelerates for withdrawing the punch from the web at a rate which will not tend to mutilate the upper fabric cover.

As previously mentioned, the web cutting and perforating mechanism is combined with a web manufacturing device and conveyor to provide an integral structure. This is illustrated diagrammatically in Fig. 7 in connection with a control mechanism for simultaneously starting and stopping the web manufacturing device and conveyor and the cutting mechanism. The drive shaft 21 is necessarily very long and under considerable torsional strain, which causes a definite twist in the shaft during operation. It is desirable, in order to prevent overrun and maintain accuracy irrespective of starts and stops, that the web manufacturing mechanism and the cutting and perforating mechanisms should be stopped simultaneously and that the torsional twist should be retained in the long drive shaft 21 while the mechanisms are stopped. This is accomplished by means of the control shown in Fig. 7 and braking mechanism shown in Fig. 2.

Fig. 7 illustrates a web manufacturing device 84 which may be of the usual type including an elongated conveyor 85 and suitable fabric feeding mechanisms for the paper or other fabric covers, together with presser rollers or the like for pressing the web after the paper is applied. This mechanism is situated at a considerable distance from the perforating and cutting mechanism in order that the web may have time to partially dry before it is cut into lengths. In order to stop and start the mechanisms in a manner to accomplish the desired results, the flywheel 29 (Figs. 2 and 6) is provided with a brake shoe 86 pivoted on the frame at 87 with its upper end secured to an arm 88 which is in turn secured to a shaft 89 also pivoted on the frame. The shaft 89 is provided with an arm 90 secured thereto and having a weight 91 thereon which normally retains the brake shoe in disengaged position. A brake operating device 92 is also mounted on the frame and provided with an operating portion secured to the arm 90 in such a manner that, when the device 92 is operated, the arm 90 will be raised to cause engagement of the brake and instantly stop the flywheel 29 and the perforating and cutting mechanisms associated therewith.

The brake operating means 92 may comprise any suitable device which may be remotely controlled, preferably a device readily available on the market and commonly known as a "thruster." The thruster may be electrically controlled for applying the brake by closing a normally open switch 93 (Fig. 7) in series with the thruster and with a suitable power source in a circuit 94.

The flywheel 29 and shaft 24 on which it is secured are driven from the drive shaft 21 by means of the chain 27, and this drive shaft 21 is also directly connected at its opposite end to drive the web manufacturing mechanism through beveled gears 94. The drive shaft 21 is operatively connected to a shaft 95 constantly driven from any suitable power source and provided with a pinion 96 in mesh with a gear 97 rotatably mounted on the drive shaft 21. The gear 97 forms the driving member of a clutch 98, the driven member 99 of which is splined on the shaft 21 for sliding movement thereon by means of a lever 100 whereby the clutch may be engaged or disengaged. The switch 93 for controlling the thruster 92 is positioned closely adjacent the clutch member 99 whereby, when this clutch member is moved to disengage the clutch and stop the web manufacturing mechanism, the switch will be closed and immediately apply the brake to the flywheel 29 to thereby simultaneously stop the perforating and cutting mechanism.

Fig. 13 illustrates a slightly modified form of stripper device. In this form a punch body 101 reciprocates in a fixed bushing 102 and a stripper device 103 is secured to the bushing by means of one or more machine screws 104. The stripper member comprises an annular ring having a cross bar 105 below the lower edge of the ring and providing a shoe for engaging the upper surface of the web as the punch is raised. The cross bar is provided with a central opening 106 for the passage of the punch tip 60.

As previously indicated, it is sometimes desirable to provide multiple scoring between severing operations. This may be accomplished by changing the ratio of the gears 15 and 16 (Fig. 5) of the cam shaft drive so that the relationship of cam shaft rotation to cutter shaft rotation is in accordance with the multiple scoring requirements. For instance, if the cam shafts 11 are operated at one-third the speed of the cutter shafts 8, two scoring operations will take place between each cutting operation, and the web will be scored in lengths which are multiples of the lengths of the severed strips. The diameter of the cam and its configuration may easily be determined to provide the desired depth of scoring cut. A method of multiple scoring is diagrammatically illustrated in Fig. 15.

Modifications may be made without departing from the spirit of the invention, and it is therefore desired that the invention be limited only by the prior art and the scope of the appended claims.

Having thus described this invention, what is claimed and desired to be secured by Letters Patent is:

1. In the plaster board art, the combination with means for continuously moving a web in a horizontal plane, of continuously rotating cutters adapted to cooperate to sever a standard plaster board length from said web with each rotation of said cutters, and means automatically operative to intermittently adjust the radial distance of said cutters relative to their axes to cause said cutters alternately to sever and score said web with the same cutting edges and in accordance with said standard board-lengths.

2. In the plaster board art, the combination with means for continuously moving a web in a horizontal plane, of means for perforating said moving web, a continuously rotating pair of cutters adapted to cooperate to sever a standard plaster board length of the perforated portion of said web with each rotation of said cutters, means automatically operative to intermittently adjust the radial distance of said cutters to cause said cutters alternately to sever and score said web with the same cutting edges in accordance with said standard perforated plaster board lengths, and means to synchronize the successive operations of said perforating means and said cutters so that all severing and scoring is accomplished in a predetermined relationship to the perforations.

3. In the plaster board art, the combination with means for continuously moving a web in a horizontal plane, of means for perforating said moving web, a continuously rotating pair of cutters adapted to cooperate to sever a standard plaster board length of the perforated portion of said web with each rotation of said cutters, means automatically operative to intermittently adjust the radial distance of said cutters to cause said cutters alternately to sever and score said web with the same cutting edges in accordance with said standard perforated plaster board lengths, and manually operable means to prevent operation of said perforating means and permit continued operation of said severing and scoring means independently thereof.

4. In the plaster board art, the combination with means for continuously moving one or more webs in a horizontal plane, of means for perforating said moving web with successive transverse rows of perforations, and a pair of continuously rotating cutters adapted to simultaneously cut from opposite sides of said web with each rotation of said cutters to sever a standard plaster board length of the perforated portion of said web intermediate rows of perforations, and manually settable means to cause said cutters to alternately score and sever said web into multiples of said lengths.

5. In the plaster board art, the combination with means for continuously moving one or more webs in a horizontal plane, of a transverse row of vertically and horizontally reciprocating punches for perforating said web with successive transverse rows of perforations, and a varying speed transmission for vertically reciprocating said punches, said transmission comprising means operable to cause a maximum vertical punch speed during the first part of the actual perforating operation and a deceleration during the latter part of said actual perforating operation while maintaining a lateral speed of said punches corresponding to the movement of said web or webs.

6. In the plaster board art, the combination with means for continuously moving one or more webs in a horizontal plane, of a transverse row of vertically and horizontally reciprocating punches for perforating said web with successive transverse rows of perforations, and a varying speed transmission for vertically reciprocating said punches, said transmission comprising means operable to cause a relatively high speed of said punches during at least a portion of the actual perforating movement and a relatively slow speed during withdrawal while maintaining a lateral speed of said punches corresponding to the speed of said web or webs.

7. In the plaster board art, the combination with means for continuously moving one or more webs in a horizontal plane, of a transverse row of vertically and horizontally reciprocating punches for perforating said web with successive transverse rows of perforations, a varying speed transmission for vertically reciprocating said punches, said transmission comprising means to cause a maximum vertical punch speed during the first part of the actual perforating operation and a deceleration during the completion of the operation, a rapid reverse of said punch movement and a comparatively slow withdrawal, and other transmission means to move said punches laterally with said web and at the same speed during the actual punching operation irrespective of vertical acceleration and deceleration.

8. The method of perforating continuously moving moist plaster board web with a serrated substantially blunt end punch having sharp peripheral edges, said web having a fabric covering on each side, comprising forcing said punch through said web and into a cooperating die to remove a plaster plug by moving said punch and die laterally at the same speed as said web and downwardly through the upper fabric at a high speed much greater than the speed of said web smoothly to cut the upper fabric and compress the web with said punch, and moving the punch at a slower speed to cause said die smoothly to cut the lower fabric and compressed plaster.

9. The method of perforating moist plaster board with a cutting punch, said board having a fabric covering on each side, comprising forcing said punch through said board and into a cooperating die to remove a plaster board plug, cutting the upper fabric cover with said punch moving at high speed, cutting the lower fabric in the die at a reduced speed, and withdrawing said punch at a slower speed.

10. A plaster board manufacturing machine comprising means for continuously moving a plaster board web from a web forming machine, a reciprocating carriage having a die holder portion below said web and a punch guide portion above said web, a vertically reciprocating punch support above said carriage, one or more punches suspended on said support for movement there- with and with said carriage for cooperation with dies in said holder, means to simultaneously move said carriage at a speed corresponding to said web speed, and means to reciprocate said punch support at varying speed throughout its stroke.

11. A plaster board manufacturing machine comprising means for continuously moving a plaster board web from a web forming machine, a reciprocating carriage having a die holder portion below said web and a punch guide portion above said web, a vertically reciprocating punch support above said carriage, one or more punches suspended on said support for movement therewith and with said carriage for cooperation with dies in said holder, means to simultaneously move said carriage at a speed corresponding to said web speed, and means to reciprocate said punch support at varying speed throughout its stroke, each punch guide comprising a reciprocating combined punch bearing and stripper, the operation of said stripper being controlled and synchronized with the punching operation by the movement of said punch.

12. In a web perforating machine, the combination with a horizontally reciprocating die carriage having a punch guide associated therewith to enable a web to pass therebetween, means to move said web at a uniform speed, a vertically reciprocating punch supporting frame having one or more punches suspended therefrom into said punch guide and laterally movable with said die carriage, means to move said die carriage and punches in the direction of movement of said web and at the same speed, and means to move said punch support at different speeds during the perforating and withdrawal operations.

13. In a web perforating machine, the combination with a horizontally reciprocating die carriage having a punch guide associated therewith to enable a web to pass therebetween, means to move said web at a uniform speed, a vertically reciprocating punch support having one or more punches suspended therefrom into said punch guide and laterally movable with said die carriage, means to move said die carriage and punches in the direction of movement of said web and at the same speed, means to move said punch support at different speeds during the perforating and withdrawal operations, a resilient support for said punch carriage, and additional resilient means effective only adjacent the end of the downward stroke of said punch carriage to cause a rapid deceleration thereof and a quick reverse and acceleration.

14. A plaster board manufacturing machine comprising an operating mechanism for a continuous-web forming device and a perforating mechanism remote from each other, a conveyor for directing a continuously moving web through said perforating mechanism, a synchronized transmission for driving all of said mechanisms to manufacture, continuously move, and perforate said web, a power source for said transmission, means adjacent one of said mechanisms for disconnecting said power source, and a brake on the other mechanism controlled by said disconnecting means for instantaneously stopping said other mechanism.

15. In a punching machine, a plurality of punches and dies to receive a continuous moving web therebetween, guide bars, a carriage slidably mounted on said guide bars for supporting said dies and for guiding and aligning said punches with said dies, a vertically reciprocating punch support having a slotted connection with each punch to enable simultaneous lateral and vertical movement thereof, means for reciprocating said carriage and punches, spring means on opposite sides of said carriage for limiting the reciprocation of said carriage in each direction on said guide bars, said spring means being effective to absorb the kinetic energy of said carriage at its extreme limits of movement, means for moving said punch support to punch holes in said web, and spring means effective to absorb the kinetic energy of said support at the extreme limit of its punching stroke.

16. In a punching machine, a plurality of punches and dies to receive a continuous moving web therebetween, guide bars, a carriage slidably mounted on said guide bars for supporting said dies and for guiding and aligning said punches with said dies, a vertically reciprocating punch support having a slotted connection with each punch to enable simultaneous lateral and vertical movement thereof, means for reciprocating said carriage and punches, spring means on opposite sides of said carriage for limiting the reciprocation of said carriage in each direction on said guide bars, said spring means being effective to absorb the kinetic energy of said carriage at its extreme limits of movement, positive means for moving said punch support to punch holes in said web, and impositive means to absorb the kinetic energy of said support at the extreme limit of its punching stroke and to move said support throughout its return stroke.

17. In a punching machine, a plurality of punches and dies to receive a continuous moving web therebetween, guide bars, a carriage slidably mounted on said guide bars for supporting said dies and for guiding and aligning said punches with said dies, a vertically reciprocating punch support having a slotted connection with each punch to enable simultaneous lateral and vertical movement thereof, means for reciprocating said carriage and punches, spring means on opposite sides of said carriage for limiting the reciprocation of said carriage in each direction on said guide bars, said spring means being effective to absorb the kinetic energy of said carriage at its extreme limits of movement, cam means for moving said punch support to punch holes in said web, spring means to move said support throughout its return stroke, and additional spring means to absorb the kinetic energy of said support at the extreme limit of its punching stroke and to cause a quick reverse.

18. In a punching machine, a plurality of punches and dies to receive a continuous moving web therebetween, guide bars, a carriage slidably mounted on said guide bars for supporting said dies and for guiding and aligning said punches with said dies, a vertically reciprocating punch support having a slotted connection with each punch to enable simultaneous lateral and vertical movement thereof, means for reciprocating said carriage and punches, spring means on opposite sides of said carriage for limiting the reciprocation of said carriage in each direction on said guide bars, said spring means being effective to absorb the kinetic energy of said carriage at its extreme limits of movement, cam means for moving said punch support to punch holes in said web, a cam follower on said support, spring means associated with said support to retain said follower on said cam, and additional spring means to absorb the kinetic energy of said support at the extreme limit of its punching stroke to cause a quick reverse and acceleration.

19. In a plaster board perforating and cutting machine, a cross beam supported adjacent a moving strip of material for movement at right angles thereto, a carriage supported between said beam and said material for movement substantially parallel to said strip of material, a plurality of punches cooperatively and slidably supported by said beam and said carriage, whereby said punches slide relative to said carriage upon movement of said beam and slide relative to said beam upon movement of said carriage, combined punch bearings and stripper plates slidably mounted in said carriage and associated with said punches, means responsive to reciprocation of said punches relative to said carriage for reciprocating said stripper plates in timed relation to said punches, cam means for moving said beam and punches and stripper plates at right angles to said strip of material to cause said stripper plates periodically to engage said material and said punches periodically to perforate said material, means for reciprocating said carriage to move said punches and stripper plates with said material during said engaging and piercing operation, means for alternately cutting and scoring said web between perforations at transverse lines spaced in accordance with standard plaster board lengths, and a positive transmission between said perforating means and said cutting means for synchronizing all of said operations.

20. In a plaster board perforating and cutting machine, a carriage mounted for reciprocating movement substantially parallel to a moving web, a transverse row of stripper plates journaled in said carriage for reciprocating movement toward and away from said material as said carriage moves with said material, punches associated with said stripper plates and movable toward and away from said material to punch said material, means for reciprocating said punches in timed relation to the reciprocating movement of said carriage, means responsive to reciprocation of said punches for effecting reciprocation of said stripper plates in timed relation to the movement of said punches, and means synchronized with said punches for alternately severing and scoring said web between predetermined transverse rows of perforations.

21. In a machine of the character described having means for continuously moving a plaster board web having upper and lower fabric covers and means for cutting said web into predetermined lengths, the combination with perforating punches and cooperating dies, of means for reciprocating said punches and dies through a perforating cycle in synchronism with said moving web and moving said punches relative to said dies during the first part of the actual perforating portion of the punch cycle at a high speed materially greater than the linear speed of said web to cut said upper fabric and compress the plug portions of said web and then reduce the speed of said punches during the remainder of said actual perforating portion of said cycle to force said plug portions through said dies whereby said lower fabric is cut solely by said dies and pressure of said plug portions thereon, said punches comprising blunt-end working portions with the end surfaces having substantially V-shaped radial grooves therein adapted to first perforate said upper fabric with a peripheral row of perforations and cut between said perforations with a shearing cut.

22. In a perforating machine of the character described for moist plaster board having upper and lower fabric covers, a die, a punch for cooperation with said die, and means for moving said punch at varying speed through said plaster board, said punch comprising an externally threaded body portion and a tip having an upper cylindrical aligning portion for snugly telescoping a complementary aligning body portion, said tip being internally threaded intermediate its length for mounting on said threaded body portion, said punch having an opening in the working face thereof adapted to receive a wrench for securing and removing said tip.

23. In a plaster board perforating machine of the character described, the combination with a punch body having a reduced end portion with its lower end threaded to receive a perforating tip and forming a tip aligning portion above said threads, a tip having an upper cylindrical aligning portion for snug telescopic aligning cooperation with said body and terminating in internal threads for securing said tip on said body, said tip having a restricted axial opening therein to receive a wrench, the working face of said tip having radial V-shaped grooves adapted to provide sharp angular peripheral shearing edges and a blunt-end punch face.

24. In the plasterboard art, the combination with means for continuously forming and moving one or more fabric covered webs in a horizontal plane between punches and dies, of a plurality of vertically and horizontally reciprocating punches for perforating said web with successive groups of perforations, the face of a punch having a series of radial teeth forming sharp peripheral points with substantially V-shaped notches therebetween, the radial apex of each tooth extending angularly upward toward the vertical punch axis and the base line between said teeth closely approaching the horizontal, said teeth being materially shorter than the thickness of the plasterboard to be perforated and with sharp cutting edges between the points, so that said punch will first perforate the upper plasterboard fabric cover with a peripheral row of perforations and cut said fabric between said perforations with a shearing cut, then apply substantially the equivalent of blunt-end punch pressure to the plasterboard plug portion to cut the lower fabric solely by the die and force the plug therethrough in the usual punch and die manner, and means to cause relatively high speed of said punches through the cutting of the upper fabric and initial compression of the plug and a relatively slower speed during the remainder of the punching stroke.

25. In the plasterboard art, the combination with means for continuously forming and moving one or more fabric covered webs in a horizontal plane between punches and dies, of a plurality of vertically and horizontally reciprocating punches for perforating said web with successive groups of perforations, the face of a punch having a series of radial teeth forming sharp peripheral points with substantially V-shaped notches therebetween, the radial apex of each tooth extending angularly upward toward the vertical punch axis and the base line between said teeth closely approaching the horizontal, said teeth being materially shorter than the thickness of the plasterboard to be perforated and with sharp cutting edges between the points, so that said punch will first perforate the upper plasterboard fabric cover with a peripheral row of perforations and cut said fabric between said perforations with a shearing cut, then apply substantially the equivalent of blunt-end punch pressure to the plasterboard plug portion to cut the lower fabric solely by the die and force the plug therethrough in the usual punch and die manner.

OTTO P. HAEGELE.